United States Patent
Benson

(10) Patent No.: US 8,323,846 B2
(45) Date of Patent: Dec. 4, 2012

(54) FUEL CELL GAS DISTRIBUTION

(75) Inventor: Paul Alan Benson, Leicestershire (GB)

(73) Assignee: Intelligent Energy Limited, Leicestershire (GB)

(*) Notice: Subject to any disclaimer, the term of this patent is extended or adjusted under 35 U.S.C. 154(b) by 1421 days.

(21) Appl. No.: 11/547,885

(22) PCT Filed: Apr. 7, 2005

(86) PCT No.: PCT/GB2005/001346
§ 371 (c)(1),
(2), (4) Date: Jan. 30, 2007

(87) PCT Pub. No.: WO2005/099008
PCT Pub. Date: Oct. 20, 2005

(65) Prior Publication Data
US 2007/0166596 A1    Jul. 19, 2007

(30) Foreign Application Priority Data
Apr. 8, 2004 (GB) .................................. 0407979.4

(51) Int. Cl.
H01M 8/02 (2006.01)
H01M 2/08 (2006.01)
(52) U.S. Cl. ........ 429/458; 429/457; 429/460; 429/480; 429/483; 429/508
(58) Field of Classification Search .................. None
See application file for complete search history.

(56) References Cited

U.S. PATENT DOCUMENTS

| | | | |
|---|---|---|---|
| 5,252,410 A | 10/1993 | Wilkinson et al. | |
| 5,683,828 A | 11/1997 | Spear et al. | |
| 5,858,567 A | 1/1999 | Spear et al. | |
| 5,863,671 A | 1/1999 | Spear et al. | |
| 5,945,232 A * | 8/1999 | Ernst et al. .................... | 429/413 |
| 5,952,119 A | 9/1999 | Wilson | |
| 6,051,331 A | 4/2000 | Spear et al. | |
| 6,117,577 A | 9/2000 | Wilson | |
| 6,727,014 B1 * | 4/2004 | Wilson et al. ................. | 429/413 |
| 6,733,915 B2 | 5/2004 | Barton et al. | |
| 6,858,341 B2 | 2/2005 | Edlund | |
| 7,341,800 B2 | 3/2008 | Sasahara et al. | |
| 7,432,008 B2 * | 10/2008 | Joos et al. ..................... | 429/437 |
| 7,534,465 B2 | 5/2009 | Sasahara et al. | |
| 7,569,300 B2 | 8/2009 | Sasahara et al. | |
| 7,670,699 B2 | 3/2010 | Sasahara et al. | |
| 7,700,218 B2 | 4/2010 | Sasahara et al. | |
| 7,727,665 B2 | 6/2010 | Sasahara et al. | |
| 7,754,368 B2 | 7/2010 | Sasahara et al. | |
| 2001/0033956 A1 | 10/2001 | Appleby et al. | |
| 2002/0058180 A1 * | 5/2002 | Beattie et al. ..................... | 429/44 |
| 2003/0157397 A1 | 8/2003 | Barton et al. | |
| 2003/0219639 A1 | 11/2003 | Edlund | |
| 2004/0016638 A1 | 1/2004 | LaConti et al. | |
| 2004/0115513 A1 | 6/2004 | Yang | |
| 2004/0151969 A1 | 8/2004 | Joos et al. | |
| 2004/0224190 A1 | 11/2004 | Sasahara et al. | |
| 2005/0048351 A1 | 3/2005 | Hood et al. | |
| 2005/0106445 A1 | 5/2005 | Mitchell et al. | |
| 2005/0175882 A1 | 8/2005 | Sasahara et al. | |
| 2005/0175888 A1 | 8/2005 | Sasahara et al. | |
| 2005/0181266 A1 | 8/2005 | Sasahara et al. | |
| 2005/0202304 A1 | 9/2005 | Peace et al. | |
| 2006/0040143 A1 | 2/2006 | Aoki et al. | |
| 2006/0154130 A1 | 7/2006 | Hood | |
| 2006/0257699 A1 | 11/2006 | Hood et al. | |
| 2006/0292429 A1 | 12/2006 | Baird et al. | |
| 2008/0102324 A1 | 5/2008 | Sasahara et al. | |
| 2008/0102325 A1 | 5/2008 | Sasahara et al. | |
| 2008/0124588 A1 | 5/2008 | Sasahara et al. | |
| 2008/0124609 A1 | 5/2008 | Sasahara et al. | |
| 2008/0145738 A1 | 6/2008 | Benson | |
| 2008/0248336 A1 | 10/2008 | Matcham et al. | |
| 2008/0314660 A1 | 12/2008 | Davies et al. | |
| 2009/0004546 A9 | 1/2009 | Sasahara et al. | |
| 2009/0029231 A1 | 1/2009 | Hood et al. | |
| 2009/0035645 A9 | 2/2009 | Sasahara et al. | |
| 2009/0136825 A9 | 5/2009 | Sasahara et al. | |

FOREIGN PATENT DOCUMENTS

EP    1 231 657    8/2002

(Continued)

OTHER PUBLICATIONS

Schmitz et al., "Stability of planar PEMFC in Printed Circuit Board technology", Journal of Power Sources 127 (2004) 197-205.*
International Search Report for PCT/GB2005/001346.
Written Opinion for PCT/GB2005/001346.
UK Patent Office Search Report for GB 0407979.4.
International Preliminary Examination Report for Application No. PCT/GB2005/001346.
Examination Report in Canadian Application No. 2,562,493, dated Sep. 2, 2011.
Examination Report in Japanese Application No. 2007-506838, dated Aug. 3, 2011 (English translation).
Examination Report in Taiwanese Application No. 094110855, dated Jul. 20, 2011 (english translation).
Machine Translation of Japanese Patent Publication No. 2004-047214 (Published Dec. 12, 2004).
Reply to Office Action in Canadian Application No. 2,562,493, dated Dec. 8, 2011.

(Continued)

*Primary Examiner* — Patrick Ryan
*Assistant Examiner* — Ladan Mohaddes
(74) *Attorney, Agent, or Firm* — Fish & Richardson P.C.

(57) ABSTRACT

A fuel cell comprising a membrane-electrode assembly having an anode electrode face; an anode plate adjacent said membrane-electrode assembly electrode face and coupled thereto by a sealing gasket. The sealing gasket, electrode face and anode plate together define a fluid containment volume for delivery of anode fluid to the electrode face. A sheet of porous diffuser material is situated in the fluid containment volume and having at least one plenum defined between at least one lateral edge of the sheet of diffuser material and the sealing gasket. Fluid for delivery to an active surface of the membrane-electrode assembly may be delivered by the plenum and by diffusion through the diffuser material to such an extent that fluid flow channels in the anode plate are not required.

19 Claims, 8 Drawing Sheets

FOREIGN PATENT DOCUMENTS

| | | |
|---|---|---|
| JP | 08-031434 | 2/1996 |
| JP | 10-106604 | 4/1998 |
| JP | 01-197972 | 8/1998 |
| JP | 2000-123850 | 4/2000 |
| JP | 2002-216780 | 8/2002 |
| JP | 2003-217615 | 7/2003 |
| JP | 2002-047214 | 2/2004 |
| JP | 2004-047214 | 2/2004 |
| JP | 2005-528742 | 9/2005 |
| TW | 301807 | 4/1997 |
| TW | 2003-01582 | 7/2003 |
| TW | 2004-04383 | 3/2004 |
| TW | 581327 | 3/2004 |
| WO | WO01/35477 | 5/2001 |
| WO | WO02/101859 | 12/2002 |
| WO | WO03/096453 | 11/2003 |
| WO | WO2004/027910 | 4/2004 |
| WO | WO2005/099008 | 10/2005 |

OTHER PUBLICATIONS

Reply to Office Action and Amended Claims in Japanese Application No. 2007-506838, dated Nov. 1, 2011 (english translation).

Examination Report in Japanese Application No. 2007-506838, dated Nov. 30, 2011 (english translation).

Response and English translation of Claims in Taiwanese Application No. 094110855, dated Oct. 24, 2011.

Notice of Allowance in Taiwanese Application No. 094110855, dated Jan. 5, 2012.

Office Action in Korean Application No. 10-2006-7023428, dated Nov. 1, 2011.

Decision to Dismiss Amendment/Decision of Refusal in Japanese Application No. 2007-506838, dated May 16, 2012 (english translation).

Machine Translation of Japanese Patent Publication No. 2003-217615 (Published Jul. 2003).

* cited by examiner

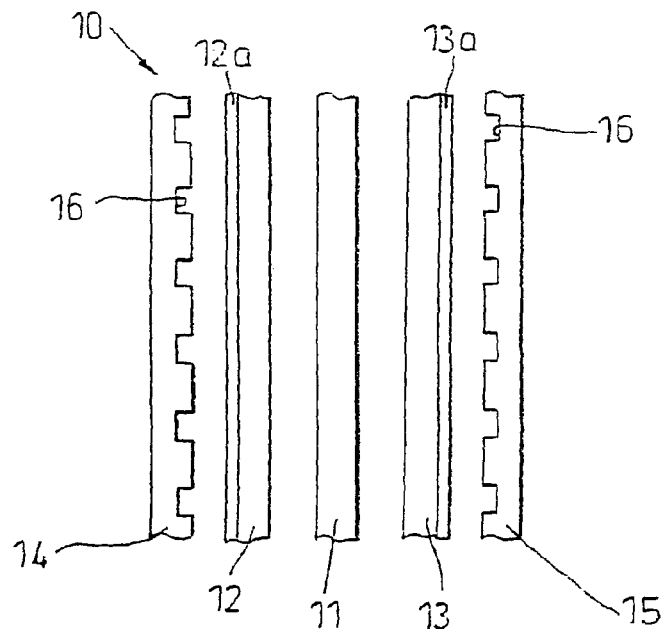
Fig. 1
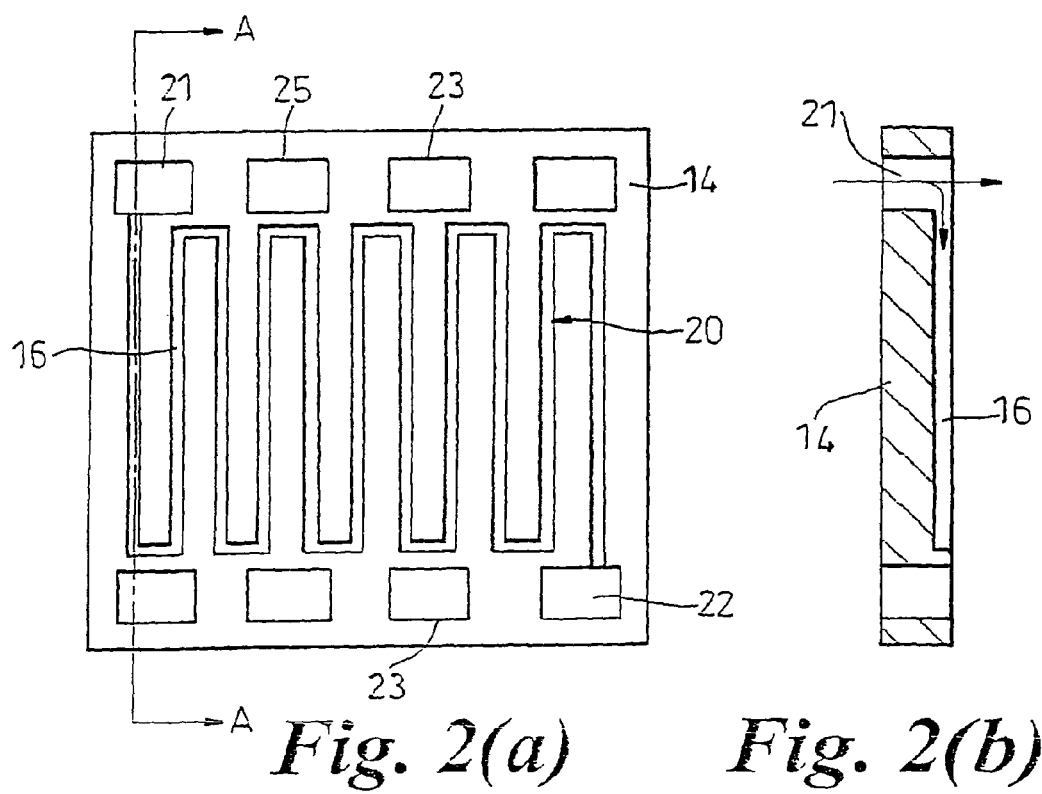
Fig. 2(a)  Fig. 2(b)

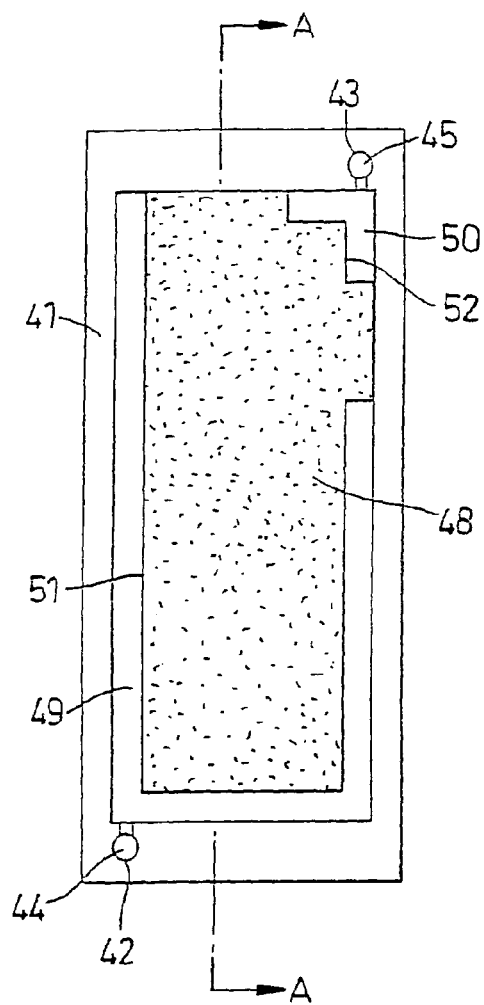
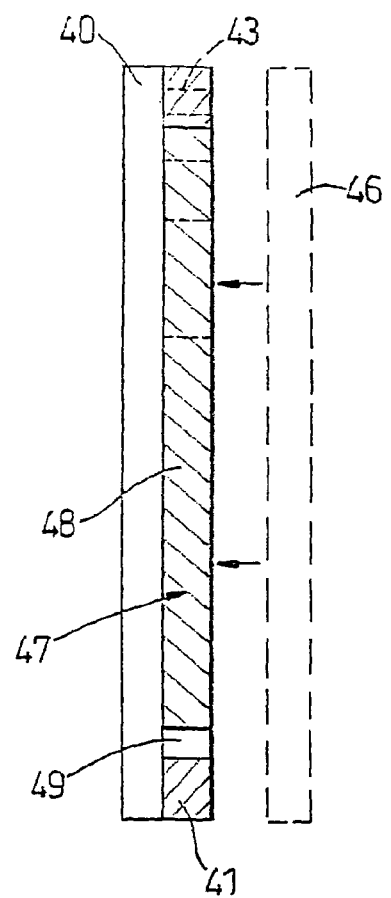
*Fig. 4(a)*  *Fig. 4(b)*

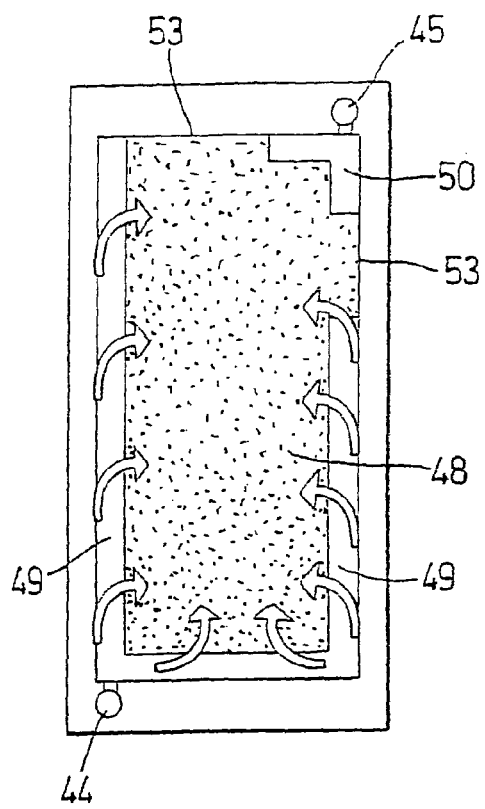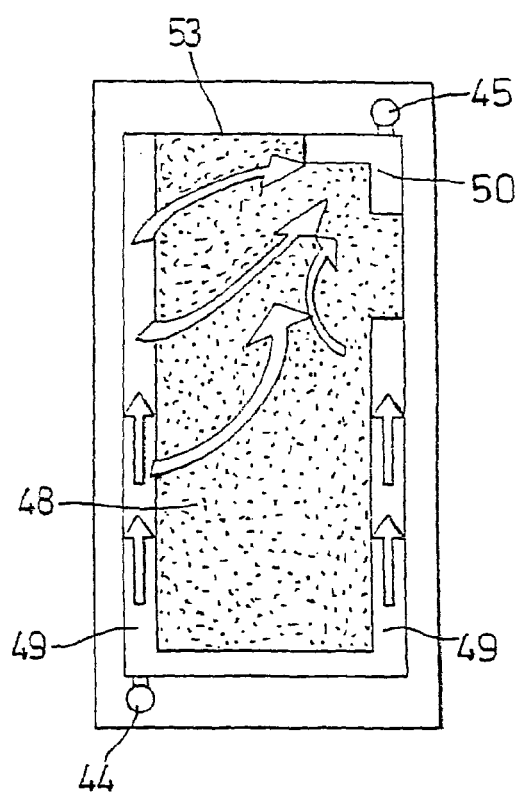
*Fig. 5(a)* *Fig. 5(b)*

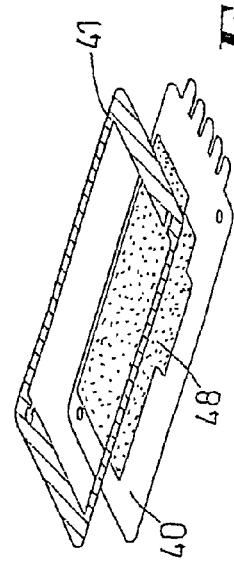 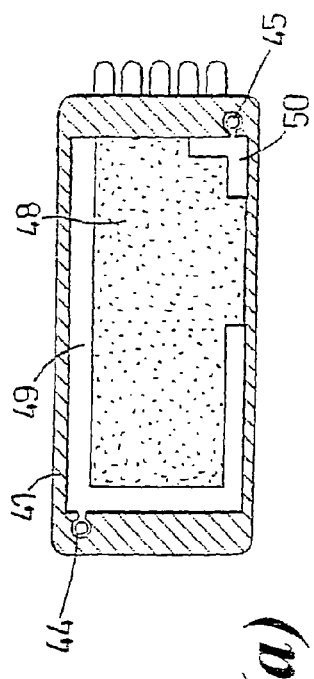
Fig. 6(a)
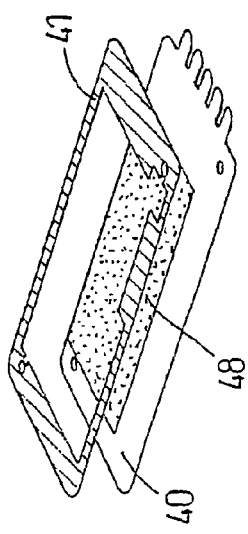 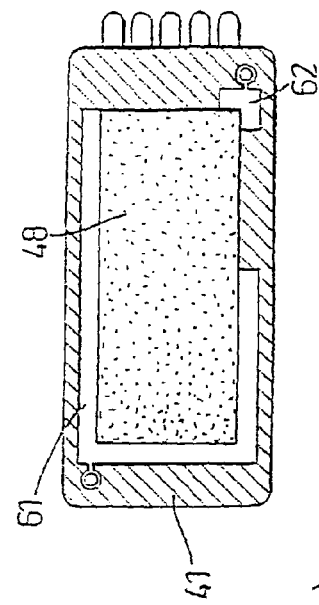
Fig. 6(b)
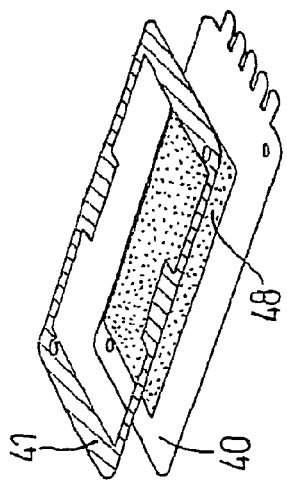 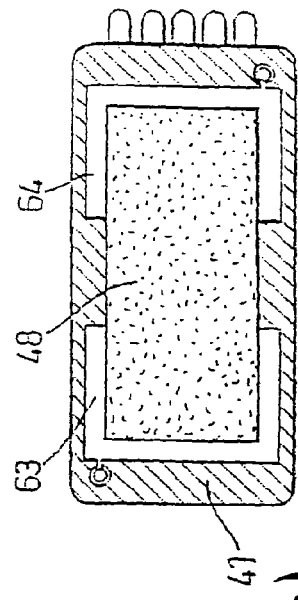
Fig. 6(c)

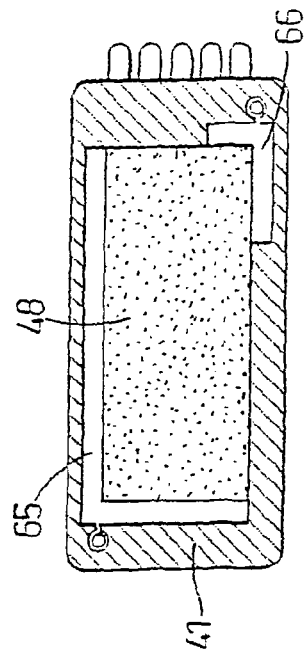
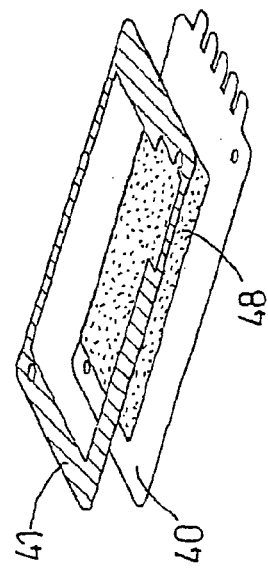
Fig. 6(d)
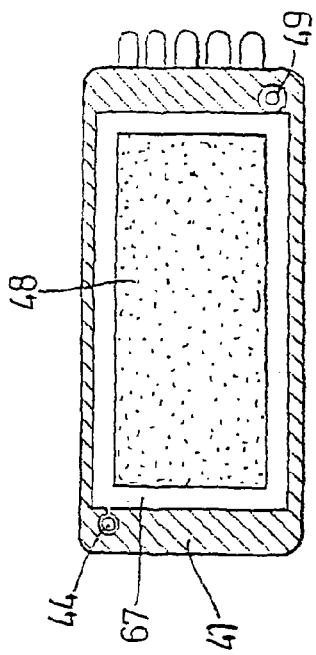
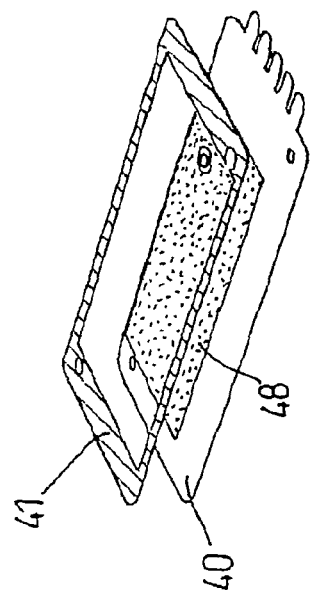
Fig. 6(e)

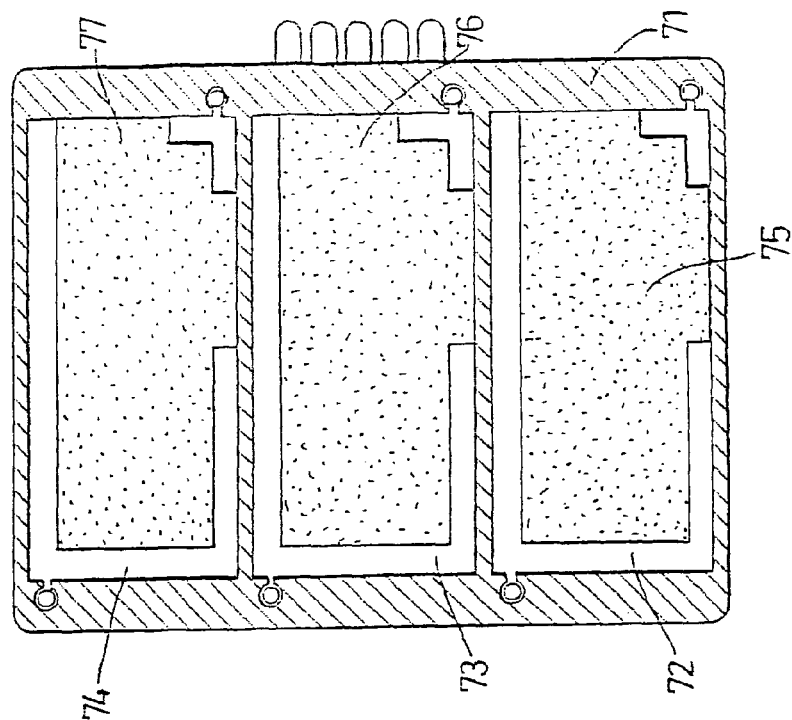
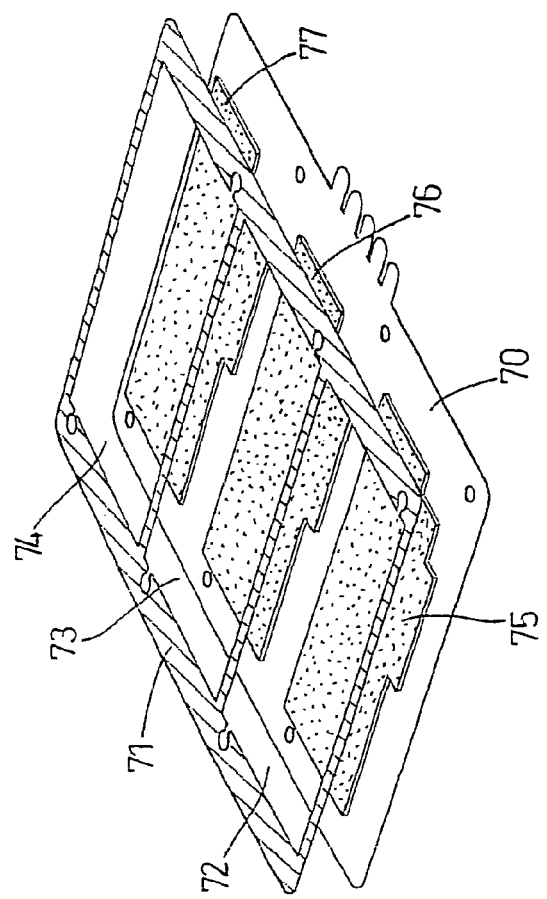
*Fig. 7(b)*
*Fig. 7(a)*

FUEL CELL GAS DISTRIBUTION

The present invention relates to fuel cells, and in particular to methods and apparatus for fluid delivery to the active surface of anode and/or cathode plates in, for example, solid polymer electrolyte fuel cells.

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15. Intermediate backing layers 12a and 13a may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting ill the management of water vapour and liquid water.

The fluid flow field plates 14, 15 are formed from an electrically conductive, non-porous material by which electrical contact can be made to the respective anode electrode 12 or cathode electrode 13. At the same time, the fluid flow field plates facilitate the delivery and/or exhaust of fluid fuel, oxidant and/or reaction product to or from the porous electrodes 12, 13. This is conventionally effected by forming fluid flow passages in a surface of the fluid flow field plates, such as grooves or channels 16 in the surface presented to the porous electrodes 12, 13.

With reference also to FIG. 2(a), one conventional configuration of fluid flow channel provides a serpentine structure 20 in a face of the anode 14 (or cathode 15) having an inlet manifold 21 and an outlet manifold 22 as shown in FIG. 2(a). According to conventional design, it will be understood that the serpentine structure 20 comprises a channel 16 in the surface of the plate 14 (or 15), while the manifolds 21 and 22 each comprise an aperture through the plate so that fluid for delivery to, or exhaust from, the channel 20 can be communicated throughout the depth of a stack of plates in a direction orthogonal to the plate as particularly indicated by the arrow in the cross-section on A-A shown in the FIG. 2(b).

Other manifold apertures 23, 25 may be provided for fuel, oxidant, other fluids or exhaust communication to other channels in the plates, not shown.

Various configurations of channels 16 in the fluid flow field plates 14, 15 are known. One configuration is the open ended serpentine pattern of FIG. 2 where the channels extend between an inlet manifold 21 and an outlet manifold 22 allowing a continuous throughput of fluid, typically used for a combined oxidant supply and reactant exhaust. In another configuration, the channels 16 may be closed at one end, i.e. each channel has communication with only an input manifold 21 to supply fluid, relying entirely on 100% transfer of gaseous material into and out of the porous electrodes of the MEA. The closed channel may typically be used to deliver hydrogen fuel to the MEA 11-13 in a comb type structure.

With reference to FIG. 3, in conventional fuel cell assemblies 30, stacks of plates are built up. In this arrangement, adjacent anode and cathode fluid flow field plates are combined in conventional manner to form a single bipolar plate 31 having anode channels 32 on one face and cathode channels 33 on the opposite face, each adjacent to a respective membrane-electrode assembly (MEA) 34. The inlet manifold apertures 21 and outlet manifold apertures are all overlaid to provide the inlet and outlet manifolds to the entire stack. The various elements of the stack are shown slightly separated for clarity, although it will be understood that they will be compressed together using sealing gaskets if required.

The formation of fluid flow channels or conduits 16 in the fluid flow field plates is an exacting procedure, typically performed using a chemical etching process or other high definition process in order that an adequate degree of control over the depth, width and pattern of the channels 16 can be achieved, while forming fluid flow field plates as thin as possible. Any inconsistencies in the chemical etch process resulting in variations in depth, width and pattern of the fluid flow plate can severely disrupt fluid flow to and from the MEA.

For example, the pressure drop between the inlet port 21 and outlet port 22 may vary significantly from plate to plate and therefore from cell to cell within a fuel cell assembly. Poorly performing cells call result in more frequent anode purging operations during operation of a cell, or can require special cell calibration techniques that are time consuming and expensive. Poorly performing cells limit the overall performance of a fuel cell stack which is generally strongly influenced by the weakest cell.

It is an object of the present invention to minimise problems associated with the formation of fluid flow channels in a fluid flow plate and/or problems arising from variations in performance of such fluid flow chapels from cell to cell.

It is a further object of the invention to increase the power density factor of a fuel cell stack by reducing the thickness of the anode field plate without significantly compromising power output.

According to one aspect, the present invention provides a fuel cell comprising:
 a membrane-electrode assembly having an anode electrode face;
 an anode plate adjacent said membrane-electrode assembly electrode face and coupled thereto by a sealing gasket;
 the sealing gasket, electrode face and anode plate together defining a fluid containment volume for delivery of anode fluid to the electrode face; and
 a sheet of porous diffuser material situated in the fluid containment volume and having at least one plenum defined between at least one lateral edge of the sheet of diffuser material and the sealing gasket.

According to another aspect, the present invention provides a fuel cell comprising:
 a membrane-electrode assembly having a cathode electrode face;
 a cathode plate adjacent said membrane-electrode assembly electrode face and coupled thereto by a sealing gasket;
 the sealing gasket, electrode face and cathode plate together defining a fluid containment volume for delivery of cathode fluid to, and/or exhausting of cathode fluid from, the electrode face; and
 a sheet of porous diffuser material situated in the fluid containment volume and having at least one plenum defined between at least one lateral edge of the sheet of diffuser material and the sealing gasket.

Embodiments of the present invention will now be described by way of example and with reference to the accompanying drawings in which:

FIG. 1 shows a schematic cross-sectional view through a part of a conventional fuel cell;

FIGS. 2(a) and 2(b) respectively show a simplified plan and sectional view of a fluid flow field plate of the fuel cell of FIG. 1;

FIG. 4a shows a plan view of an anode configuration having a sheet of diffuser material positioned with respect to a sealing gasket and fluid entry and exit ports, and FIG. 4b shows the corresponding sectional side view on line A-A;

FIG. 5 shows a plan view of the anode configuration of FIG. 4 showing gas flows during both regular operation (FIG. 5a) and anode purge (FIG. 5b);

FIG. 6 shows a number of alternative patterns of plenum defined between lateral edges of a sheet of diffuser material and peripheral sealing gasket;

FIG. 7 shows an anode configuration comprising multiple co-planar half-cells sharing a common anode plate.

Figure 3:
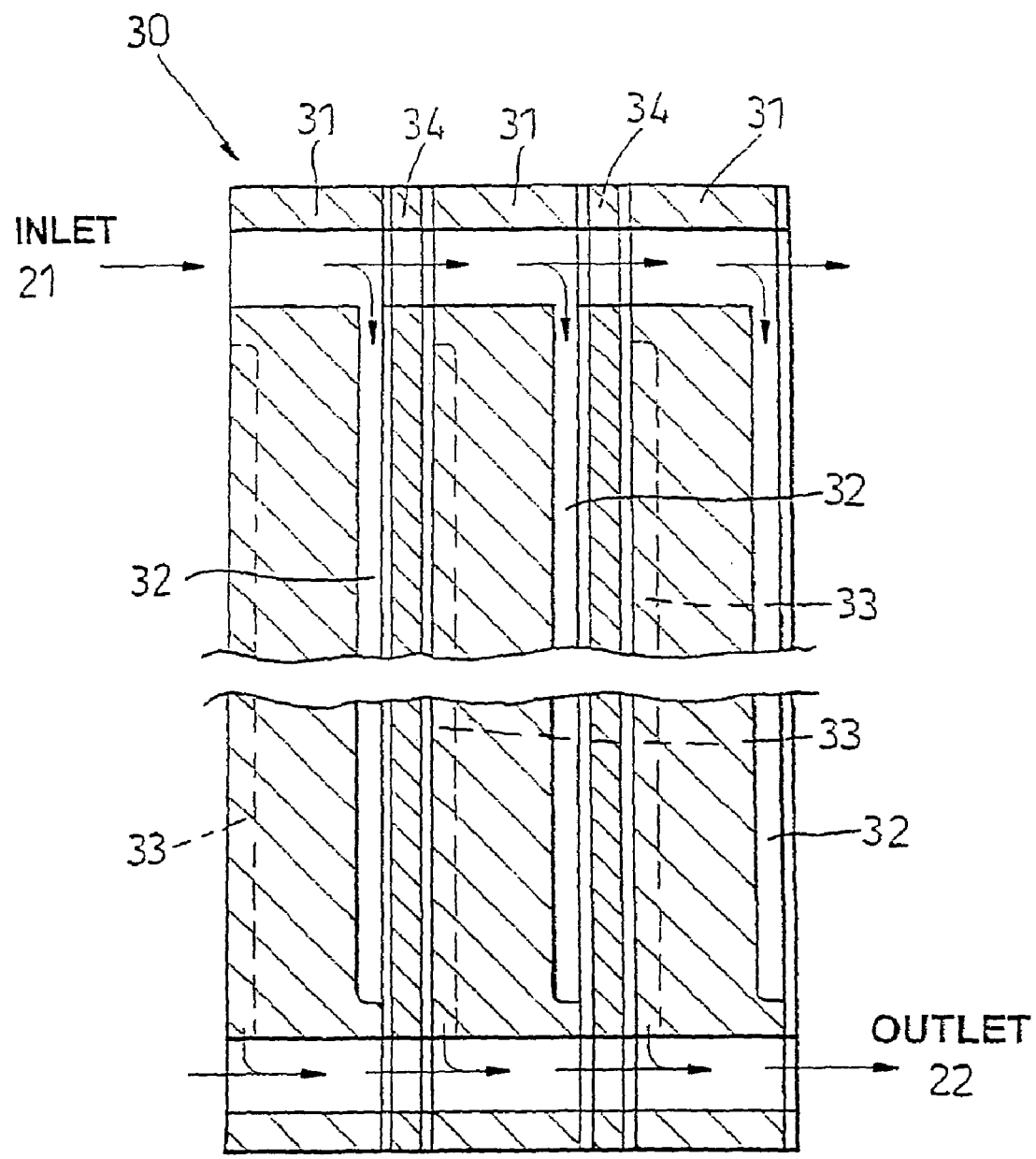
FIG. 3 shows a cross-sectional view through a conventional fuel cell stack with bipolar plates.

The conventional designs of anode and cathode fluid flow plates incorporating fluid flow channels in the faces thereof have already been discussed in connection with FIGS. 1 to 3. These fluid flow channels generally extend over a significant proportion of the surface of the plates and are used in order to ensure sufficient transport of anode and cathode fluids to the active surfaces of the MEA. As also shown in FIG. 1, a porous diffuser material 12a, 13a is incorporated into a conventional fuel cell to assist transfer from the channels 16 to the MEA 11 allowing substantial cross-plane diffusion (i.e. normal or transverse to the plane of the diffuser) and a small amount of in-plane diffusion (i.e. parallel to the plane of the diffuser) so as to allow diffusion of anode fluid out from each individual channel 16. In this way, good transport of anode fluid is effected to and from the entire active anode surface of the MEA, and good transport of cathode fluid is effected to and from the entire active cathode surface of the MEA.

The present invention has recognised that certain types of porous diffuser materials can be used in conjunction with a pressure differential between inlet and outlet ports to ensure sufficient in-plane fluid transport within the diffuser that fluid transport to the entire surface of the membrane is possible without the use of fluid flow channels in the anode plate.

Referring to FIG. 4, an anode face of a membrane-electrode assembly 40 is overlaid with a sealing gasket 41 around its perimeter. The sealing gasket 41 includes two recesses 42, 43 around a fluid entry port 44 and a fluid exit port 45 at a periphery of the anode face of the MEA 40. An electrically conductive anode plate 46 overlies the sealing gasket (shown in dashed outline in FIG. 4b and slightly separated for clarity, but omitted in FIG. 4a to reveal the structures below).

The anode face of the MEA 40, the sealing gasket 41 and the anode plate 46 together define a fluid containment volume 47 between the fluid entry port 44 and the fluid exit port 45. The fluid containment volume is effected by the impermeability of the anode plate 46 and sealing gasket 41 together with limited permeability of the MEA (i.e. substantially allowing ion flow only). Within this containment volume 47 is laid a sheet of diffuser material 48. The sheet of diffuser material is cut to a shape which results in the foliation of one or more plenums 49, 50 defined between a lateral edge 51, 52 of the sheet 48 and the sealing gasket 41. More particularly, in the embodiment of FIG. 4, the first plenum 49 constitutes an inlet plenum that extends around a major portion of the peripheral lateral edge 51 of the sheet 48 of diffuser material (i.e. most of three sides). The second plenum 50 constitutes an outlet plenum that extends around a minor portion of the peripheral lateral edge 52 of the sheet 48 of diffuser material.

The anode plate 46 is preferably devoid of any grooves or channels 16 in its surface 52 facing the electrode 40 and diffuser sheet 48, since fluid transport can be effected entirely by way of the plenums 49, 50 and diffuser material 48 itself. This is illustrated in more detail with reference to FIG. 5.

FIG. 5a illustrates fluid flow patterns during regular operation of the fuel cell. Inlet fluids arriving under pressure from entry port 44 are distributed along the inlet plenum 49 and into the body of the porous diffuser sheet 48 (and the underlying MEA 40) as indicated by the arrows. In this regular operation mode, the outlet plenum 50 need not take a part (although it can do so), since the essential function is to deliver fluid fuel to the active surface of the anode face of the MEA 40. Preferably, this is achieved such that adequate fuel supply reaches all active parts of the anode face of the MEA 40 so as to maintain the required power delivery from the cell without causing localised hot spots. However, this does not preclude the possibility that some small proportion of fuel or some by-product could be purged to the outlet plenum 50 and thus to the exit port 45 during regular operation of the fuel cell.

FIG. 5b illustrates fluid flow patterns during purge operation of the fuel cell. Inlet fluids arriving under pressure from entry port 44 are distributed along the inlet plenum 49 and through the body of the porous diffuser sheet 48 (and the underlying electrode 40) to the outlet plenum 50 and thus to the exit port 45, as indicated by the arrows. As will be understood by those familiar with fuel cell operation, regular switching of a fuel cell to a purge mode when performance of the fuel cell drops (e.g. because of build-up of water in the electrode) is often used as part of a system management strategy.

It is found that the 'partial seal' 53 formed between the lateral edge of the diffuser sheet 48 and the gasket 41 edge where the plenum is not formed is adequate to prevent significant leakage of fluid directly around the diffuser material from inlet plenum 49 to outlet plenum 50. For preference, the 'partial seal' is achieved by effecting a close fit or interference fit between the edge of the diffuser sheet 48 and the corresponding edge of the gasket 41. Some compression of the diffuser material during stack assembly may assist in formation of this partial seal.

The configuration of diffuser sheet 48 and sealing gasket 41 as shown in FIGS. 4 and 5 is but one alternative. FIG. 6 shows numerous other possible arrangements, that achieve a similar objective, in both perspective 'exploded' view (left side figures) and in plan view (right side figures).

FIG. 6a illustrates the pattern of FIG. 4 for comparison purposes. FIG. 6b illustrates a similar pattern of inlet plenum 61 and outlet plenum 62, but in this arrangement, the sealing gasket 41 is shaped to create the plenums 61, 62 rather than the diffuser sheet 48 being shaped to create the plenums. This facilitates the use of rectangular or square shaped sheets of diffuser material rather than irregular shaped sheets 48 of diffuser material.

FIG. 6c illustrates a symmetric arrangement of inlet plenum 63 and outlet plenum 64, again relying on shaping of the sealing gasket 41 rather than the diffuser sheet 48 so that rectangular or square diffuser sheets may be used. In this configuration, inlet plenum 63 and outlet plenum 64 are balanced, having substantially equal lengths and in-plane fluid flow through the diffuser medium is generally from one end to the other.

FIG. 6*d* illustrates an arrangement similar to that of FIG. 6*b* but with the inlet (major) plenum 65 extending only along two lateral edges of the diffuser sheet 48 and a slightly larger outlet plenum 66 than that of FIG. 6*b*. In this arrangement, the in-plane fluid flow is somewhat more diagonal and homogeneous.

FIG. 6*e* illustrates an arrangement in which a separate outlet plenum is not required. Only a single circumferential or peripheral plenum 67 is provided entirely surrounding the diffuser sheet 48. Purging of the plenum 67 is still possible using the exit port 45. Purging of the diffuser 48 and electrode 40 would be possible only to a lesser extent, relying on out-diffusion into the plenum 67 rather than forced diffusion by substantial pressure differential across the diffuser. This arrangement has particular application where anode purging is not normally required.

Thus, in a general sense, it will be understood that the sheet of porous diffuser material may have an irregular (non-rectangular) shape including recesses in its perimeter to thereby form the at least one plenum. Alternatively, the sheet of porous diffuser material may have a rectangular perimeter and the sealing gasket has an irregular (non-rectangular) shape including recesses in its internal perimeter to thereby form the at least one plenum.

FIG. 7 illustrates an arrangement in which co-planar fuel cells are formed using a single, common anode plate (not shown) and a single common electrode 70. In this arrangement, the sealing gasket 71 is configured to form three separate fluid containment volumes 72, 73, 74 each with its own respective sheet of diffuser material 75, 76, 77. The configuration of diffuser sheet and sealing gasket used to define the plenums may be varied, e.g. as discussed in relation to FIG. 6.

This arrangement compartmentalises each anode half-cell in the fuel cell stack into separate fluid feed and purge areas which may afford a greater degree of uniformity of gas flows across large area anodes. In particular, the effects of any restriction on the diffusion rate of fluid across the electrode face between inlet and outlet plenums are minimised by limiting the area of the diffuser sheets 75, 76, 77 in this way.

Figure 8:
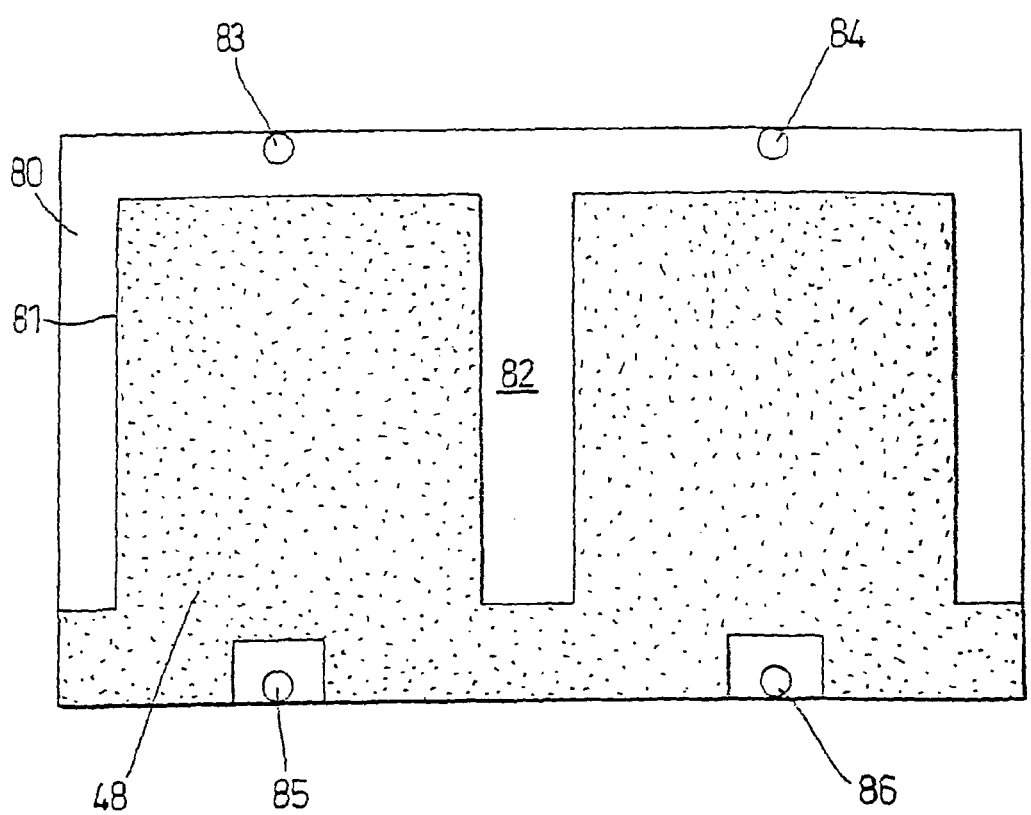
FIG. 8 shows an alternative pattern of plenum defined between lateral edges of a sheet of diffuser material and peripheral sealing gasket.

FIG. 8 illustrates an arrangement in which the plenum 80 may be defined not just between a lateral edge 81 of the diffuser sheet 48 but also by way of a slit 82 cut through the body of the diffuser sheet and extending into a central area of the diffuser sheet. FIG. 8 also illustrates that two or more entry ports 83, 84 and/or two or more exit ports 85, 86 may be used.

In preferred embodiments, the MEA 40 is manufactured as a thin polymer layer sandwiched between electrode layers on either side, respectively forming the anode face and the cathode face. The faces of the MEA preferably comprise a central 'active' area surrounded by a peripheral area (or 'frame') which is reinforced to allow the formation of entry and exit polls (e.g. ports 44, 45 of FIG. 4) and other manifolds with reduced risk of damage to the structural integrity of the MEA. In this reinforced peripheral area, the MEA can cope with various strains and forces mulch more effectively than the thin active area of the electrode.

Where such a reinforced MEA is used, it is preferable that the peripheral plenums (e.g. 49, 50 and 61 to 67 of FIGS. 6*a* to 6*e*) are located overlying the reinforced peripheral area of the MEA to help avoid any risk that structural failure could occur in the MEA due to lack of support to the central active area of the MEA when the fuel cell is compressed during assembly of a fuel cell stack. The structure of the reinforced peripheral areas of the MEA is not affected by water content to the same extent as the active areas of the membrane-electrode assembly. The active area of the MEA could otherwise swell and partially block plenums when wet, or produce weak structural points if dried out by the feed hydrogen.

All of the arrangements described above have been illustrated by reference to the anode side of a fuel cell (i.e. an anode half-cell). However, it will be understood that a corresponding cathode half-cell could utilise a similar half-cell structure as described in connection with FIGS. 4 to 6, or could use other conventional types of half-cell construction, for example using fluid flow plates having fluid distribution channels therein.

In a preferred embodiment, the cathode half-cell comprises a conventional 'open cathode' configuration in which the cathode is open to atmosphere for both oxygen supply, by-product exhaust and cell cooling. Preferably, the cathode is force vented (e.g. by fan) for delivering oxygen and cooling air and for expelling water vapour by-product.

Elimination of channels or grooves 16 in the anode plate 40 enables a substantial reduction in the thickness of the anode plate when compared with the fluid flow plate 14 (FIG. 1). In one design, the thickness of each anode plate has been reduced from 0.85 mm to just 0.25 mm with consequent substantial increase in power density of the fuel cell stack. The reduction of thickness of each anode plate in the stack offers a substantial reduction in both weight and volume of the fuel cell stack.

It has also been found that the absence of channels 16 in an anode plate 14 reduces the plate area for which there is no direct electrical contact between the plate 14 and the electrode 12. In other words, there is almost 100% contact area between the anode plate and the diffuser material. In the prior art electrodes, any discontinuities in electrical contact between the anode plate and the electrode locally raises current densities between the channels.

The present invention enables avoidance of the non-contact areas of channels 16, consequently reducing ohmic losses as a result of reduced current densities generally across the area of the electrode.

Eliminating the need to form channels 16 in the anode plate 14 also simplifies manufacturing processes. It has been found to be much easier to cut to shape the sealing gasket 41 and/or the diffuser sheet 48 than to etch or stamp channels 16 into the anode plate 14.

In preferred arrangements, the fuel cell is a hydrogen fuel cell, in which the anode fluid fuel is gaseous hydrogen, the cathode fluid is air and the by-product exhaust is water vapour and oxygen-depleted air. The inlet fluid may also include other gases (e.g. for ballast, purge or membrane hydration). The use of an anode plate 40 without channels and reliant on gas distribution via the plenums 49, 50 and on in-plane diffusion within the diffuser material has been found to be most effective for transport of hydrogen gas to the catalyst sites of the electrode. High diffusivity rates of hydrogen and the low overpotential of the hydrogen oxidation reaction on catalyst sites are utilised.

In order to ensure a good supply of fluid fuel to the entire active surface of the anode electrode, it is advantageous to have a relatively high diffusivity of the anode gas through the diffuser sheet 48 compared with a relatively lower rate of diffusivity within the anode electrode 40 (and any backing layer 12*a* thereon).

The anode configuration works best when a significant pressure differential is maintained between the entry port 44 and the exit port 45 to give forced diffusion. This also is shown to reduce purging time.

Preferably, the diffuser material has axially-dependent permeability. In other words, gas transport rate in one in-plane direction may be different than gas transport rate in another in-plane direction. In this case, the diffuser sheets may be advantageously oriented such that the most effective and homogeneous gas transport between the plenums or from the inlet plenum to the central region of the diffuser sheet is effected. Diffuser materials may have an orientation of fibres (e.g. a woven mat) which provides this axial dependency, and the fibres can preferably be oriented in an 'across-the-cell' direction to assist with hydrogen transport to the centre of the half-cell. In addition, homogeneity of gas transport to the electrode may be improved when the in-plane diffusion rate of the diffuser material is higher than the cross-plane diffusion rate.

To ensure optimal diffusion rate across the diffuser material, it should not be significantly crushed or compressed during assembly of the fuel cell, i.e. when all the stack plates are compressed together to form the fuel cell assembly. Preferably, the sealing gasket 41 material is selected to be harder (less compressible) than the diffuser 48 material for this reason.

Suitable materials for use as the diffuser sheet 48 are gas diffusion media TGP-H grades of carbon fibre paper manufactured by Toray.

In preferred embodiments, the sealing gasket 41 has a thickness lying in the range 100 to 400 microns, and the diffuser sheet 48 has a thickness lying in the range 150 to 500 microns. In one preferred embodiment, the sealing gasket has a thickness of 225 microns, and the diffuser sheet has a thickness of 300 microns.

The distribution of anode gas using peripheral plenums and diffuser material as described above may also offer advantages in water management at the electrode. Build-up of water causes flooding of the electrode. In conventional fluid flow plate designs using channels in the plate, during flooding water pools at the edges of the active area of the electrode where it cools. There is little or no current generation at the edges of the active area, therefore no heat generation and the water remains stationary until a purge is performed.

By contrast, in the present invention, water pools towards the central region of the active area. This maintains hydration of the MEA but also has the effect of reducing current flow in the flooded areas. In adjacent active areas where the water has not pooled, there is higher current flow, more rapid depletion of hydrogen and therefore a region of lower pressure. The hydrogen and water both preferentially move to this region of lower pressure as a result of the pressure gradients, thereby reducing the localised flooding.

Other embodiments are intentionally within the scope of the accompanying claims.

The invention claimed is:

1. A fuel cell comprising:
    a membrane-electrode assembly comprising an anode electrode face;
    an anode plate adjacent to the anode electrode face and coupled to the anode electrode face by a sealing gasket, the anode plate comprising an aperture that extends therethrough, the aperture comprising a fluid entry point;
    the sealing gasket, anode electrode face, and anode plate together defining a fluid containment volume for delivery of anode fluid to the anode electrode face; and
    a sheet of diffuser material that is porous, that is in the fluid containment volume, and that comprises at least one plenum defined between at least one lateral edge of the sheet of diffuser material and the sealing gasket;
    wherein the at least one plenum is configured to distribute fluid received directly from the fluid entry point to the sheet of porous diffuser material.

2. The fuel cell of claim 1, wherein the at least one plenum is defined between a whole of one lateral edge of the sheet of the diffuser material and the sealing gasket.

3. The fuel cell of claim 2, wherein the at least one plenum is defined between more than one lateral edge of the sheet of diffuser material and the sealing gasket.

4. The fuel cell of claim 1, wherein the at least one plenum comprises a slit extending into a body of the sheet of diffuser material.

5. The fuel cell of claim 1, wherein the at least one plenum is a peripheral plenum that extends around an entire lateral edge of the sheet of diffuser material.

6. The fuel cell of claim 1, wherein the at least one plenum comprises a first plenum that communicates with the fluid entry point at a peripheral edge of the fluid containment volume;
    wherein the at least one plenum includes a second plenum defined between at least one lateral edge of the sheet of diffuser material and the sealing gasket, the second plenum communicating with an exit point at a peripheral edge of the fluid containment volume, and
    wherein the second plenum is separated from the first plenum by the diffuser material.

7. The fuel cell of claim 1, wherein a surface of the anode plate presented to the anode electrode face has a substantially smooth surface.

8. The fuel cell of claim 1, wherein the anode plate has no fluid distribution channels formed in a surface of the anode plate that is presented to the anode electrode face.

9. The fuel cell of claim 1, wherein the sheet of diffuser material comprises a carbon fiber mat.

10. The fuel cell of claim 1, wherein the sheet of diffuser material has an axially-dependent permeability.

11. The fuel cell of claim 10, wherein the sheet of diffuser material is oriented such that a direction of highest permeability is disposed to assist maximum gas transport from the at least one plenum to a center of the sheet of diffuser material.

12. The fuel cell of claim 6, wherein the sheet of diffuser material is oriented such that a direction of highest permeability is disposed to assist maximum gas transport from the first plenum to the second plenum.

13. The fuel cell of claim 1, which is formed in a unitary assembly of multiple co-planar cells sharing a common anode plate but defining multiple independent co-planar fluid containment volumes, each of the multiple independent co-planar fluid containment volumes comprising a sheet of diffuser material.

14. The fuel cell of claim 1, wherein the sheet of diffuser material has an irregular shape including recesses in a perimeter of the sheet of diffuser material to thereby form the at least one plenum.

15. The fuel cell of claim 1, wherein the sheet of diffuser material has a rectangular perimeter and the sealing gasket has an irregular shape including recesses in an internal perimeter of the sealing gasket to thereby form the at least one plenum.

16. The fuel cell of claim 1, further comprising:
    a cathode plate adjacent to a cathode electrode face of the membrane electrode assembly.

17. The fuel cell of claim 16, wherein the cathode electrode has an open cathode configuration.

18. A fuel cell stack comprising the fuel cell of claim 16.

19. A fuel cell comprising:

a membrane-electrode assembly comprising a cathode electrode face;

a cathode plate adjacent to the cathode electrode face and coupled to the cathode electrode face by a sealing gasket, the cathode plate comprising an aperture that extends therethrough, the aperture comprising a fluid entry point;

the sealing gasket, cathode electrode face, and cathode plate together defining a fluid containment volume for delivery of cathode fluid to the cathode electrode face; and a sheet of porous diffuser material in the fluid containment volume and that comprises at least one plenum defined between at least one lateral edge of the sheet of porous diffuser material and the sealing gasket wherein the at least one plenum is configured to distribute fluid received directly from the fluid entry point to the sheet of porous diffuser material.

\* \* \* \* \*